United States Patent [19]

Yamaguchi et al.

[11] Patent Number: 4,567,529
[45] Date of Patent: Jan. 28, 1986

[54] IMAGE SENSOR

[75] Inventors: Kazufumi Yamaguchi, Yao; Takahiko Murata, Osaka, both of Japan

[73] Assignee: Matsushita Electric Industrial Co., Ltd., Osaka, Japan

[21] Appl. No.: 617,566

[22] Filed: Jun. 5, 1984

[30] Foreign Application Priority Data

Oct. 26, 1983 [JP] Japan ............................ 58-200294
Jan. 6, 1984 [JP] Japan ................................. 59-976

[51] Int. Cl.$^4$ .................... H04N 1/02; H04N 1/10; H04N 3/14
[52] U.S. Cl. .................................. 358/294; 358/213; 358/293; 250/578
[58] Field of Search .................... 358/293, 294, 213; 250/578; 307/313, 315

[56] References Cited

U.S. PATENT DOCUMENTS

| | | | |
|---|---|---|---|
| 4,145,721 | 3/1979 | Beaudouin et al. | 250/578 |
| 4,237,383 | 12/1980 | Kosonocky et al. | 250/578 |
| 4,279,000 | 7/1981 | Fukuda et al. | 358/213 |
| 4,405,857 | 9/1983 | Hirai et al. | 250/578 |
| 4,495,409 | 1/1985 | Baji et al. | 250/578 |

Primary Examiner—Howard W. Britton
Assistant Examiner—John K. Peng
Attorney, Agent, or Firm—Wenderoth, Lind & Ponack

[57] ABSTRACT

A linear image sensor of a self-scanning type comprising a phototransistor array and a scanning circuit, whose circuit comprises decoders of current switches connected dendritically, input signal converter circuits generating input signals for driving the current switches, and a current switch array which turns on or off charging currents to the phototransistors according to whether or not an output current of decoder exists, so that video signals from the phototransistors, when the output currents of decoder flow, are obtainable from the phototransistors in the charge storage mode, all the transistors for scanning circuit being operated in non-saturation condition for high-speed operation and the input signals being encoded so that the input signals to the decoder vary by one bit at each scanning step for noise reduction. The cancellation circuit of dark signal and noise signal is also provided.

20 Claims, 8 Drawing Figures

IMAGE SENSOR

BACKGROUND OF THE INVENTION

1. Field of the Invention

This invention relates to a linear image sensor made of a bipolar integrated circuit technique and more particularly to an elongate integrated image sensor used for an original read scanner or the like in order to read image-formation on the sensor, isometric to the original.

2. Description of the Prior Art

The image sensor using the integrated circuit technique and formed on silicon crystals includes a charge-coupled device (CCD) image sensor and a metal oxide semiconductor (MOS) image sensor. Generally, the image sensor comprises a plurality of photo-detecting elements and scanning circuits, the CCD image sensor using a photodiode for the detecting element and a charge coupled device for the scanning circuit, and the MOS image sensor using a photodiode for the detecting element and a shift register of MOS transistor for the scanning circuit. These image sensors each comprise the photodetector unit and scanning circuit unit on the basis of MOS integrated circuit technique and have high resolution, but are defective in the following matters: The CCD image sensor, which uses, as the signal medium, charge carriers essentially in thermal nonequilibrium condition, becomes larger in dark signal at a high temperature. Also, in a case of reading contracted image-formation, the potential well size of CCD is small (7 to 14 $\mu$m) to enable high speed scanning, but in a case of reading the isometric image, the necessary potential well size is larger (62 to 125 $\mu$m) to result in low speed scanning, in turn read-out at low speed. On the other hand, the MOS image sensor also of high resolution is slow at the scanning speed due to the limit in the maximum clock frequency of MOS shift register and also its video signal is weak and the scanning digital signal interferes intensively with the video signal line, resulting in a poor signal-to-noise ratio.

Recently, for miniaturization, high resolution and easy adjustment of the original read scanner, a contact type image sensor to read images isometric to the original has largely been developed, which has relatively larger element pitch (for example, pitch: 62.5 $\mu$m at a resolution of 16 dots/mm and pitch: 125 $\mu$m at that of 8 dots/mm) and needs a length corresponding to a width of the original. To meet the above requirement, there are an amorphous silicon image sensor whose photo-detecting units are integrally elongate and a large number of driving LSI chips are mounted therearound, and a CCD multichip image sensor which mounts a plurality of CCD image sensors zigzag on a substrate. The amorphous silicon image sensor, whose detecting units are separate from driving units, has many connecting wires with each other and is problematical in reliability, the CCD multichip image sensor being defective in that rearrangement of lines after read-out is required due to the zigzag arrangement, the transfer speed lowers due to its large potential well size, and a capacity load of driving circuit increases.

SUMMARY OF THE INVENTION

An object of the invention is to provide an image sensor of self-scanning type which forms detecting units and scanning units on the same silicon chip and reads the original information optically at high speed, high sensitivity and high resolution. The image sensor of the invention is optimum especially for the contact type image sensor to read images isometric to the original information.

A self scanning type image sensor of the invention comprises: a photo transistor array composed of a plurality of phototransistors for converting an optical signal to an electric current signal; a first current switch array composed of a plurality of current switches which are connected with said plurality of phototransistors respectively; a plurality of decoder circuits each for selecting one of said plurality of current switches of said first current switch array according to a first control signal; a second current switch array composed of a plurality of current switches for selecting one of said plurality of decoder circuits according to a second control signal; a current source circuit for supplying a current to said selected one of said plurality of decoder circuits through selected one of said plurality of current switches of said second current switch array; a drive circuit for producing said first control signal applied to each of said plurality of decoder circuits and said second control signal applied to said second current switch array; and an output circuit for converting said current signal from said phototransistor array to a voltage signal.

Each of said plurality of decoder circuits comprises a plurality of stages of current switch arrays composed of a plurality of dendritically connected current change-over switches each having a common input terminal, two output terminals and two control terminals corresponding to said two output terminals; the first stage of said plurality of stages of current switch arrays comprising a single current changeover switch connected at its common input terminal with one of said plurality of current switches of said second current switch array; the two output terminals of each of said plurality of current changeover switches of the last stages of said plurality of stages of current switch arrays being connected with two of said plurality of current switches of said first current switch array respectively; each of said plurality of current changeover switches of the other stages of said plurality of stages of current switch arrays being connected at its common input terminal with an output terminal of one of said plurality of current changeover switches of the previous stage and at its two output terminals with the common input terminals of two of said plurality of current changeover switches of the next stage thereby to be connected dendritically, and wherein said first control signal is composed of a plurality of pairs of complimentary signals applied to said plurality of stages of current switch arrays, respectively, each pair of said plurality of pairs of complimentary signals being applied respectively to said two control terminals of said plurality of current changeover switches of each of said plurality of stages of current switch arrays.

The image sensor chip is limited in length by the size of silicon wafer (about 4 to 6 in. in diameter) and the yield of chip, thereby being about 30 to 70 mm long. Hence, the elongate image sensor to meet width of original needs a plurality of chips mounted on the substrate, for example, eight chips are required to constitute the contact type image sensor for reading a letter-size original by use of chip of 28 mm in effective sensing length.

A scanning circuit comprises a plurality of decoder circuits, an input signal converter circuit for driving the decoder circuit, and a current source for the decoder circuit. An external selecting input signal (signal to assign a reading phototransistor) assign a current flow in any output terminal at any decoder. The circuits all operate in the current mode, the respective decoder circuits comprising current switching circuits dendritically connected. Since amplitude of signal to operate these current switches is small by about 0.5 V and each transistor operates in active condition, the high speed scanning is possible. In order to reduce noises caused by the selecting input signal interferences into the video signal output terminal, the current switches are connected so that they operate, as the Gray code, by the changed bit number of 1 at each scanning step. In order words, the decoder circuit is adapted to scan with the signal changing only 1 bit when scanning the adjacent phototransistor.

Access circuits for the phototransistors and video signal output circuits comprise current switches which turn on or off according to whether or not the current output from the respective decoder circuits, and circuits for connecting the output terminal at each current switch to one terminal of each phototransistor, the other terminal thereof connected in common being the video output terminal.

The photocurrent signal obtained at video output terminal is converted into voltage signal by an operational amplifier. The main video signal is developed at a timing of turing on of the switching transistor to recharge the electric charge in the phototransistor discharged by the photocurrent. The auxiliary video signal is developed at a timing of turning off the switching transistor by the stored charge when the switching transistor operates in saturation. Another object of the invention is to provide a novel circuitry for suppressing the auxiliary video signal.

In the image sensor for detection in the charge storage mode, especially the photodetecting element (phototransistor in the present invention) is important to restrict a leakage current to a minimum. A second embodiment of the invention is provided with a second phototransistor array light-shielded and paired with the first detecting phototransistor array so that the second phototransistor array is connected to have access at every pair with the detecting phototransistor, and the leakage current are output from the common connecting line for second phototransistor. In such circuit, an output amplifier, such as an operational amplifier, can give its differential output to thereby enable the leakage current to be canceled. Also, this circuit can cancel not only the leakage current but also noises caused by interferences of the scanning digital to the video signal output line, thereby enabling the noises to be largely reduced. Thus, the leakage current and noise reduced by the differential effect can provide an image sensor of reduced dark output and noise output and of enlarged dynamic range.

Still another object of the invention is to provide a driving circuit for the image sensor. The driving circuit comprises, a timing control circuit, a counter, code change circuit, and a block signal generator.

Accordingly, the image sensor of the invention can be manufactured with the technique as to the bipolar integrated circuit and provide a novel circuitry of the image sensor.

These and other objects and features of the invention will become more apparent in the detailed description and examples which follow.

DESCRIPTION OF THE PREFERRED EMBODIMENTS

Figure 1A:
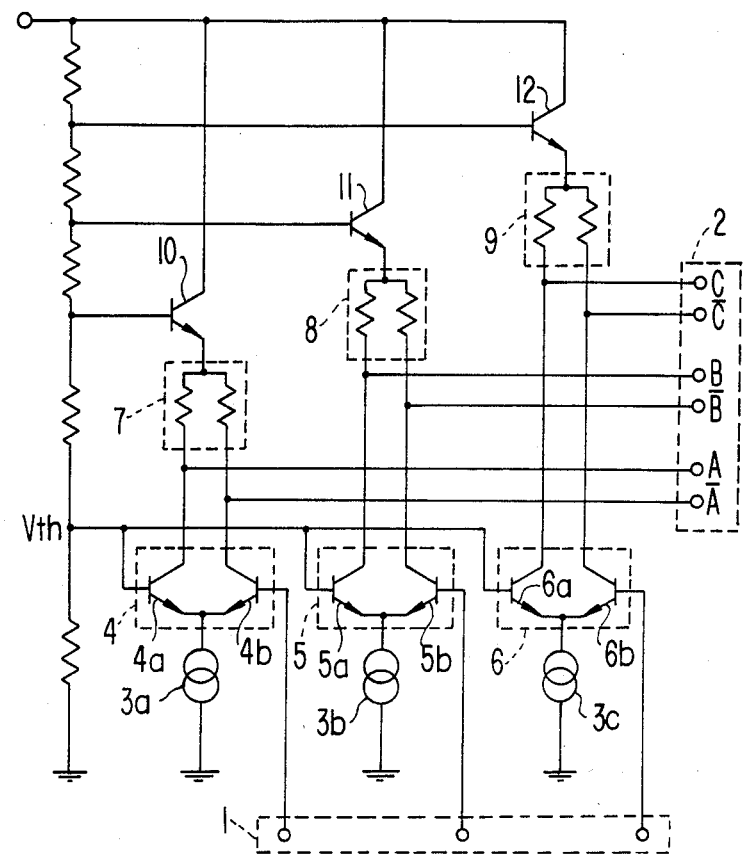
FIG. 1a is a circuit diagram exemplary of a signal converter circuit for operating a decoder in an image sensor of the invention.
Figure 1B:
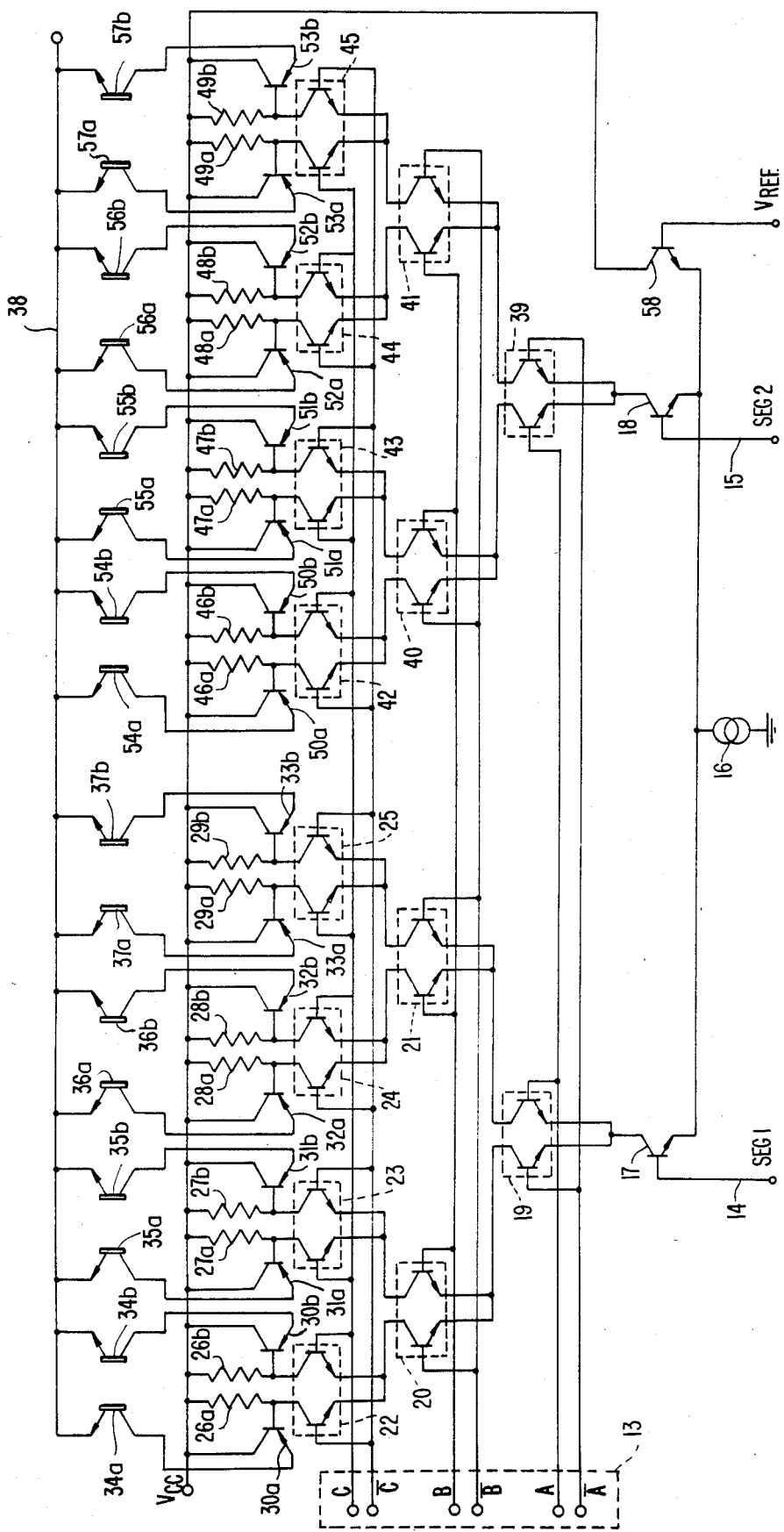
FIG. 1b is a circuit diagram exemplary of a decoder unit and a detecting unit of the image sensor of the invention.

Referring to FIG. 1-a, an input signal conversion circuit (in a case of 3 bits) at an image sensor of the invention. Decoder circuits (of 16 bits output) and detecting element units of the invention are shown in FIG. 1-b. The input signal conversion circuit in FIG. 1-a receives the selecting input signals at input terminals 1 to convert the signals into double-ended-balanced signals different in a DC level. Currents from current sources 3a, 3b and 3c are switched by transistor pairs 4, 5 and 6 constituting current switches which conducts current toward the transistor 4a or 4b, 5a or 5b, or 6a or 6b, according to the result of comparison of selecting input signal with logic threshold voltage $V_{th}$. The output currents from the current switches, resistance pairs 7, 8 and 9, and DC level setting transistors 10, 11 and 12, give converted signal output terminals 2 the double-ended-balanced signals different in the DC level, the signal amplitude being small by about 0.5 V and less affecting the video output line, the transistor pairs 4, 5 and 6 being operable at high speed because of operation in non-saturation condition.

In FIG. 1-b, the double-ended-balanced signals are received by input terminals 13 and the block selecting input signals by input terminals 14 and 15 respectively so that a current from a current source 16 and selected by the block selecting input signal is led to the branches selected by the double-ended-balanced signals and then phototransistors connected to the branches are allowed to have access, in other words, they are put into the reading condition. The above circuit in FIG. 1-b comprises current switch groups connected dendritically with each other. Transistors 17 and 18 together with a transistor 58 comprise current switches operating through the block selecting signals. Transistor pairs 19, 20, 21, 22, 23, 24 and 25 are connected as current switches for switching, according to the double-ended-balanced signals, and currents given to the emitters at each transistor pair and constitute a first decoder operating in the current mode. The current from the current source selected by the block selecting input signal flows into the branches selected by the double-endedbalanced signals, through the current switches connected dendritically to thereby generate a potential difference at one of load resistances 26a, 26b, 27a, 27b, 28a, 28b, 29a and 29b. PNP transistors 30a, 30b, 31a, 31b, 32a, 32b, 33a and 33b are switching transistors turned on or off according to whether or not the potential difference exists at both ends of each load resistance, the collectors of which are connected to a positive power source, the bases to one end of load resistance, and the emitters to the collectors of phototransistors 34a, 34b, 35a, 35b, 36a, 36b, 37a and 37b respectively. Reference numeral 38 designates a video output line connecting in common the emitters of the phototransistors 34a through 37b. At the timing of turning off the switching PNP transistors in saturation, the storage charge is given to the phototransistors to develop recharge and a auxiliary video signal appears on the video output line 38 to be mixed with a main video signal from next phototransistor, thereby substantially lowering the resolution. The collectors larger in capacity than the bases are connected to the positive power source and the emitters smaller in that than the same are connected to the collector of the phototransistors, whereby the storage charges are reducible, thus enabling the auxiliary video signal to be reduced to a minimum. The emitters at the phototransistors are connected in common to form a video output terminal. The double-ended-balanced input signals 13, which are connected to the bases at the current switching transistor pairs at the respective stages, are connected in such a manner that, when the adjacent phototransistors scan, the input signal need not be given the digits of plurality of bits. Transistor pairs 39, 40, 41, 42, 43, 44 and 45 constitute a second decoder operating in the current mode as the same as the transistor pairs 19, 20, 21, 22, 23, 24 and 25. Also, reference numerals 46a, 46b, 47a, 47b, 48a, 48b, 49a and 49b designate load resistances, 50a, 50b, 51a, 51b, 52a, 52b, 53a and 53b designate switching PNP transistors on or off according to whether or not the potential difference exists across both ends at each load resistance, and 54a, 54b, 55a, 55b, 56a, 56b, 57a and 57b designate detecting phototransistors respectively, the connections thereof being the same as the left half in the block diagram in FIG. 1-b as above-mentioned.

Next, explanation will be given on the concrete operation of the image sensor of the invention. When the block input terminal 14 is at a H (high) level, that 15 is at a L (low) level, and the double-ended-balanced input signals A, B and C all are at the L level, the current from the current source flows in the resistance 26a only but not in other load resistances. As a result, the PNP transistor 30a lowers in its base potential and turn on so that a charging current flows only in the phototransistor 34a, which is put in a reading (access) condition. No current flows in other phototransistors so that they are put in the integration (non-access) period in the charge storage mode. Thus, the block selecting input signal or double-ended-balanced input signal is changed to put a desired phototransistor in the read condition, thereby enabling its photoelectric conversion signal, i.e., video signal, to be fetched.

Figure 2:
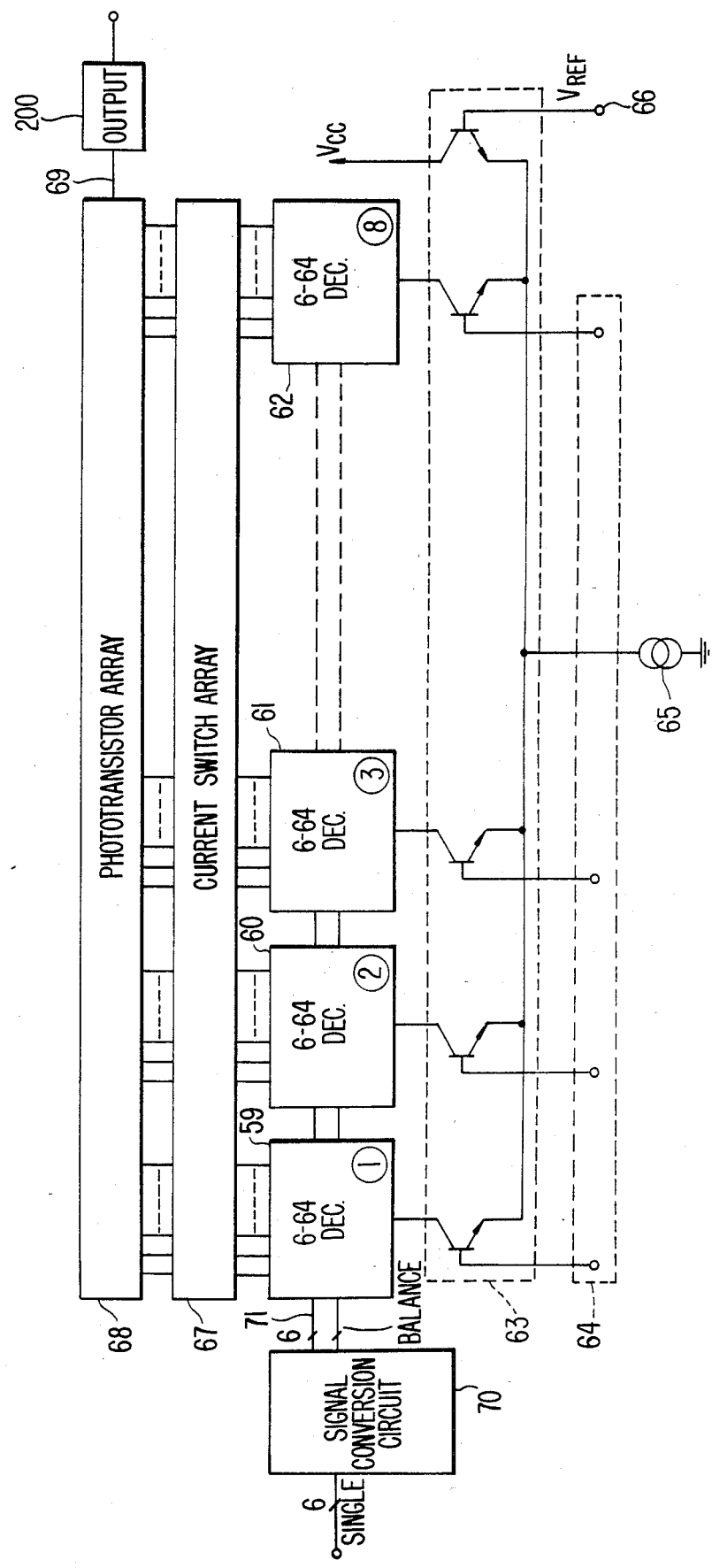
FIG. 2 is a block diagram of an embodiment of the image sensor of the invention.

Next, explanation will be given on the image sensor of 512 bits as the actual case in accordance with the FIG. 2 block diagram. In the same drawing, reference numerals 59, 60, 61 and 62 designate decoders at groups of current siwtches of 6 bits input- 64 bits output, which allow a current from the current source 65 to flow in one of branches according to the double-ended-balanced signal, 63 designates current switches each receiving block selecting input signal at an input terminal 64 thereof a current from a current source 65 and flowing it into one of the decoders, 66 designates a terminal applied with reference logic level voltage for block selecting input signal, 67 designates a PNP transistor array for switching, connected to the outputs of decoders and being on or off according to existence of potential difference across both ends of each load resistances, 68 designates a phototransistor array connected to the switching PNP transistor array, and 69 designates a video output terminal connected in common with the emitters of phototransistors at the array 68. The current signal obtained at the output terminal 69 is converted to a voltage signal by an output circuit 200.

Figure 3:
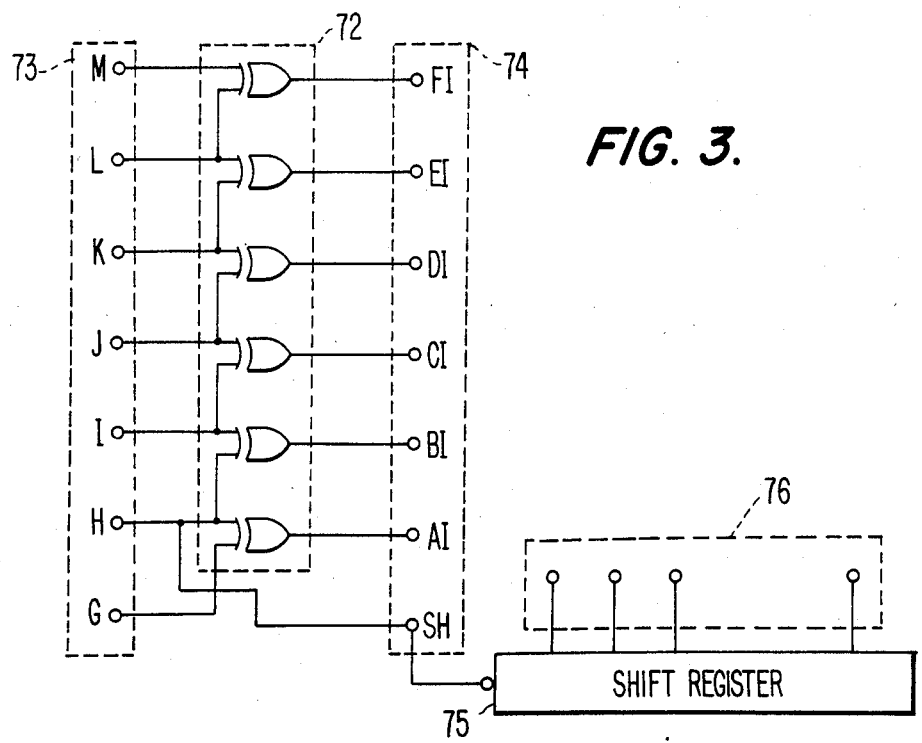
FIG. 3 is a block diagram exemplary of a code conversion circuit for the selecting input signal at the image sensor of the invention.

Now, the signals counted up successively by the Gray code like are converted by a input signal conversion circuit 70 into the double-ended-balanced signals different in the DC level and thereafter applied to an input terminal 71 at each decoder and then the signals shifting at every 64 counts are given to a block selecting input signal terminal block 64, thereby performing the scanning. The present invention, even when the block selecting input signal varies, is designed to suppress by 1 the bit number of input signal varying inclusively of the above variation, which is apparent from FIG. 1-b and the input signal in the actual case in FIG. 2 can be formed by use of a circuit shown in FIG. 3, in which reference numeral 72 designates an exclusive OR gate array, 73 designates input terminals for natural binary codes from the counter (terminal M is at the LSB side and G at the MSB side), 74 designates output terminals for giving decoder scanning input signals like the Gray code (terminal FI at the LSB side and that AI at the MSB side), terminal SH giving shift clock signals to a shift register 75 connected to the same so that the register 75 is shifted at the timing of down edge of shift clock, and 76 designates output terminals for the block selecting signals. Hence, such code conversion can obtain the scanning signal having the bit number of 1 for the input signal variable at a desired scanning step. For example, when the natural binary code steps up from logic (0111111) to (1000000), the input signal of 7 bits is changing. However, as a result of code conversion, in this stepup, the decoder scanning signal (AI to FI) does not vary as logic (100000)→(100000) so that the shift pulse is developed at the terminal SH following change of logic "1"→"0" at the terminal H of input signal terminal block 73, whereby the block selecting signal shifts to make active the adjacent block. Even in such case, the change is restricted to 1, whereby the influence of scanning input signal on the video output signal is restricted to a minimum.

Figure 4:
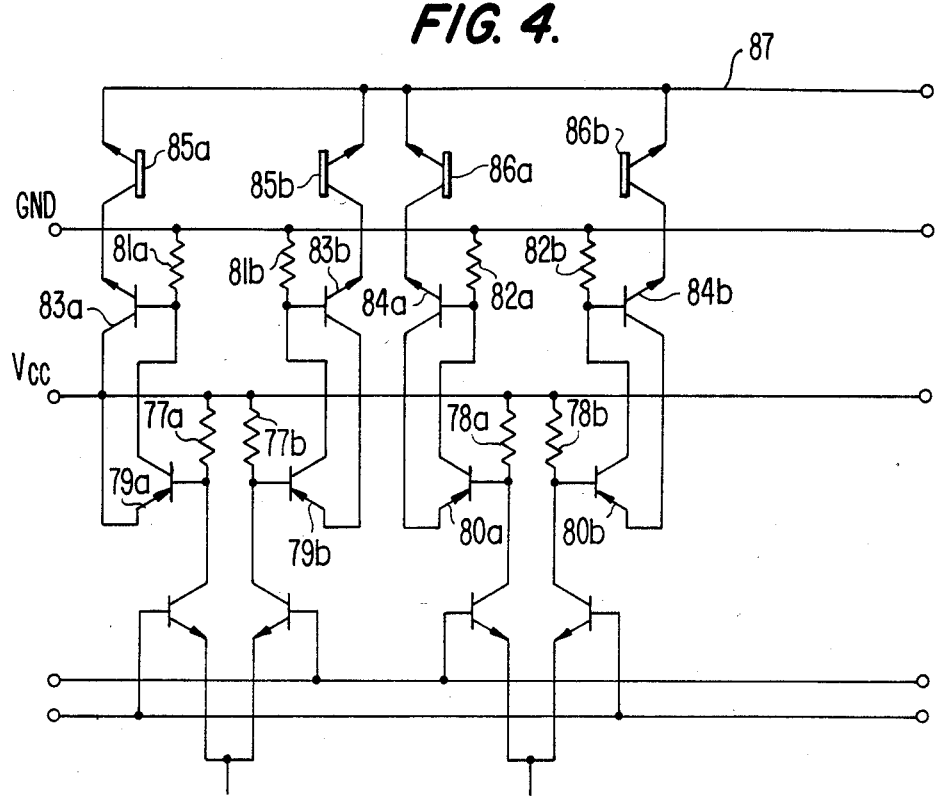
FIG. 4 is a circuit diagram of an embodiment of an access circuit to phototransistors by an output of the decoder of the invention.

Next, explanation will be given on a second embodiment in accordance with FIG. 4, which uses PNP transistors and NPN transistors in composite connection instead of switching transistors in the former embodiment. FIG. 4 shows the connection of the decoder output unit, switching transistors and phototransistors of the second embodiment. In the same drawing, reference numerals 77a, 77b, 78a and 78b designate load resistances connected to the output of decoder, 79a, 79b, 80a and 80b designate switching PNP transistors respectively, 81a, 81b, 82a and 82b designate load resistances for the switching PNP transistors 79a through 80b respectively, 83a, 83b, 84a and 84b designate switching NPN transistors for controlling charging currents to phototransistors 85a, 85b, 86a and 86b on or off according to whether or not terminal voltage exists on the load resistance 81a, 81b, 82a or 82b, and 87 designates a video output terminal in the common line for the emitters of phototransistors, the circuit of decoder unit being the same as the first embodiment. As seen from the first embodiment, in a case where the switching PNP transistors are saturated, at the timing of turning said transistors off, the storage charges flow into the phototransistors, the recharge is developed, the auxiliary video signal appears on the video output line and mixes with the main video signal for the next phototransistor, thereby essentially lowering the resolution. In this embodiment, the load resistances 81a, 81b, 82a and 82b are selected properly of each value, thereby enabling complete prevention of saturation of switching PNP transistors and improvement in the linearity of video output with respect to intensity of the light radiation. Also, the switching NPN transistors act as buffers between the scanning signal line and the video output line, thereby improving a signal-to-noise ratio.

Figure 5:
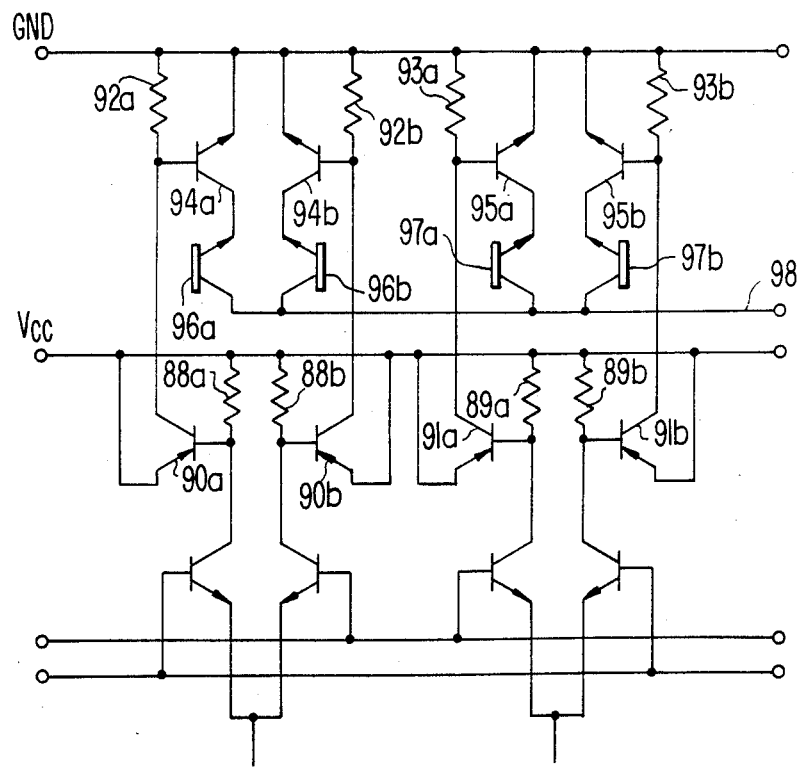
FIG. 5 is a circuit diagram of another embodiment of the access circuit to the phototransistors by the output of decoder of the invention.

Next, explanation will be given on a third embodiment of the invention in accordance with FIG. 5, in which a decoder output unit, switching transistors and phototransistors, are connected with each other. In the same drawing, reference numerals 88a, 88b, 89a and 89b designate load resistances connected to the outputs of the decoders, 90a, 90b, 91a and 91b designate switching PNP transistors, 92a, 92b, 93a and 93b designate load resistances for the switching PNP transistors respectively, and 94a, 94b, 95a and 95b designate switching NPN transistors for controlling charging currents to phototransistors 96a, 96b, 97a and 97b on or off according to whether or not terminal voltage exists on the load resistances 92a through 93b. In this case, the collectors of switching NPN transistors are connected to the emitters of phototransistors respectively, the collectors thereof being connected in common to form a video output terminal 98. Hence, for the bipolar integrated circuit technique, separate regions need not be interposed between the respective phototransistors, thereby enabling the space density of phototransistor to be raised.

Figure 6:
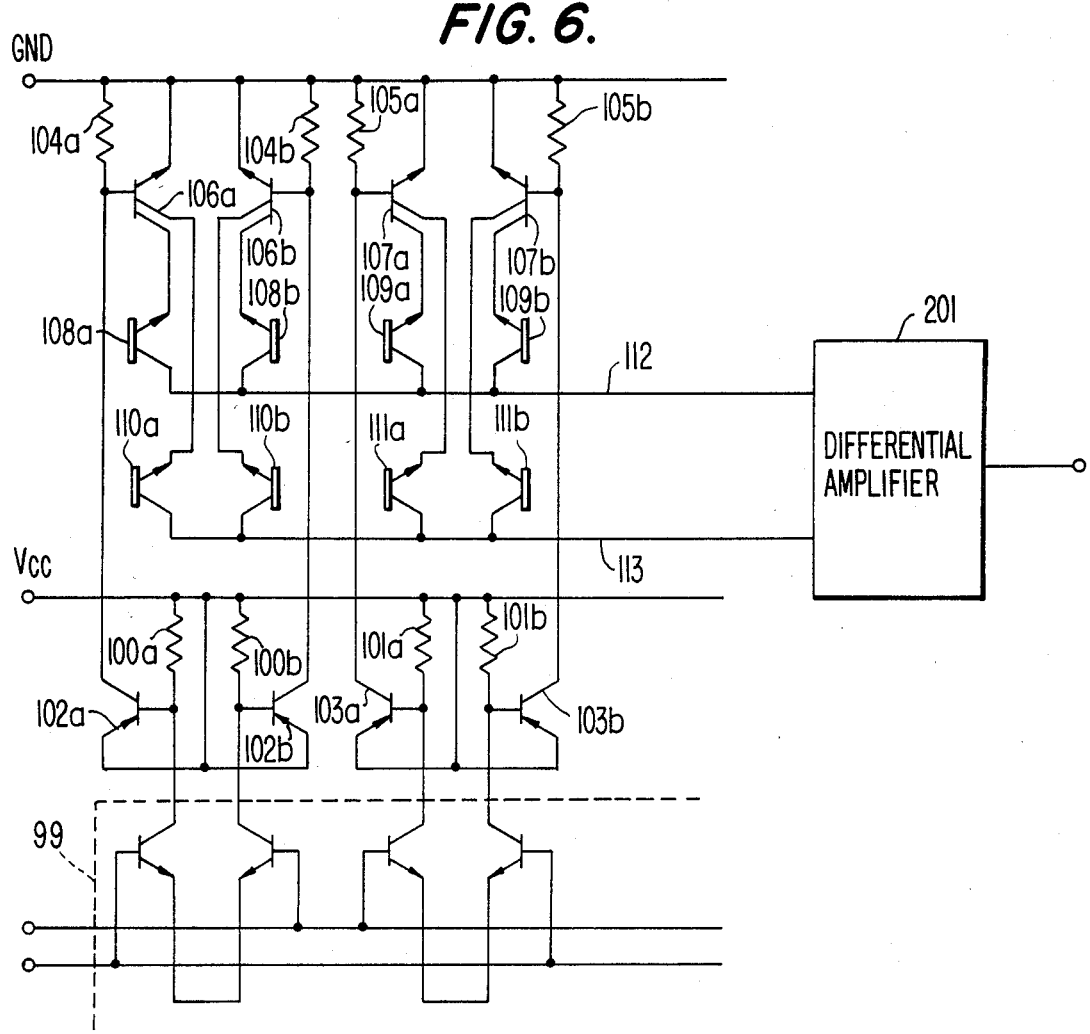
FIG. 6 is a circuit diagram of still another embodiment of the access circuit to the phototransistors by the output of the decoder of the invention.

Next, explanation will be given on a fourth embodiment of the invention in accordance with FIG. 6, in which reference numeral 99 designates a decoder unit the same as the first embodiment, 100a, 100b, 101a and 101b designate load resistances connected to the outputs of decoders respectively, 102a, 102b, 103a and 103b designate switching PNP transistors, 104a, 104b, 105a and 105b designate load resistances for the switching PNP transistors 102a through 103a, and 106a, 106b, 107a and 107b designate switching NPN transistors for controlling on or off charging currents to phototransistors 108a, 110a, 108b, 110b, 109a, 111a, 109b and 111b, according to whether or not terminal voltages exist on the load resistance 104a, 104b, 105a, 105b, the phototransistors 108a, 108b, 109a and 109b constituting a first phototransistor array and connecting at the emitters to the collectors of corresponding switching NPN transistors 106a through 107b respectively and at the collectors in common. The phototransistors 110a, 110b, 111a and 111b constitute a second phototransistor array and connect at the emitters to the collectors of corresponding switching NPN transistors 106a through 107b, and at the collectors in common, thereby forming a second video output terminal 113. Incidentally, the separate regions between the respective phototransistors, similarly to the former embodiment, need not be interposed between the phototransistors connected at the collectors in common. One phototransistor array is provided with a light-receiving window and the other phototransistor array is light-shielded so that the video output signal is obtained from the common collector terminal at the phototransistors at the light receiving side and noise and dark signal output are obtained from the common collector terminal of phototransistors at the light shielding side, whereby a signal difference is picked up from both the terminals to enable cancellation of noise and dark signal caused by the noise current and the leakage current. The differential signal can be obtained by a differential amplifier 201.

Figure 7:
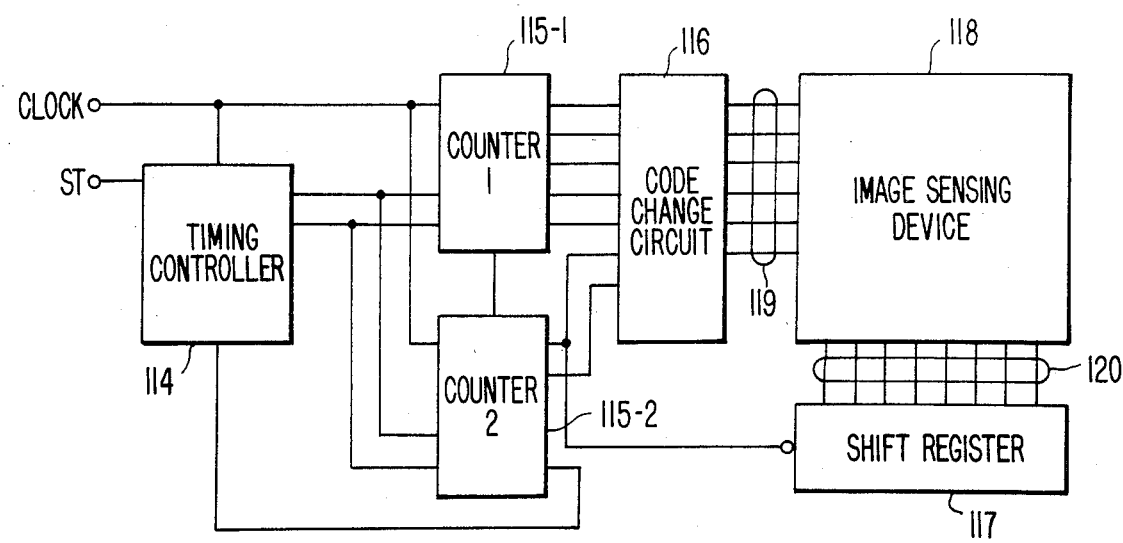
FIG. 7 is a block diagram exemplary of a driving circuit for the image sensor of the invention.

Referring to FIG. 7, a driving circuit for the image sensor of the invention is shown, which comprises a timing controller 114, binary counters 115, a code converter 116, a shift register 117, and an image sensor 118. The driving circuit is given the start signal and clock signal from the system side, the timing controller 114 synchronizing start pulse (ST) with clock pulse, the counter 115 counting up the pulses up to the dot number of image sensor, and the code converter 116 converting a desired bit output (input bit of decoder) at the LSB side into the code in which the changed bit number of input signal is 1 during the scanning on the adjacent sensor, and thereafter applying the converted code into the decoder input terminals 119 within the image sensor. Block selecting input signals 120 are given from the output of shift register 117 shifting at the timing of carry of decoder input signal. Alternatively, in the driving circuit, the scanning in the reverse direction may be applicable in such a manner that the counters may be put in a down count mode and the shift register may shift at the timing of borrow of decoder input signal, thus making it possible to read the original in the reverse direction.

What is claimed is:

1. A self scanning type image sensor for converting an optical signal to an electric signal comprising:
   a photo transistor array composed of a plurality of phototransistors for converting an optical signal to an electric current signal;
   a first current switch array composed of a plurality of current switches which are connected with said plurality of phototransistors respectively;
   a plurality of decoder circuits each for selecting one of said plurality of current switches of said first current switch array according to a first control signal;
   a second current switch array composed of a plurality of current switches for selecting one of said plurality of decoder circuits according to a second control signal;
   a current source circuit for supplying a current to said selected one of said plurality of decoder circuits through selected one of said plurality of current switches of said second current switch array;
   a drive circuit for producing said first control signal applied to each of said plurality of decoder circuits and said second control signal applied to said second current switch array; and
   an output circuit for converting said current signal from said phototransistor array to a voltage signal.

2. The image sensor according to claim 1, wherein each of said plurality of decoder circuits comprises a plurality of stages of current switch arrays composed of a plurality of current changeover switches each having a common input terminal, two output terminals and two control terminals corresponding to said two output terminals; the first stage of said plurality of stages of current switch arrays comprising a single current changeover switch connected at its common input terminal with one of said plurality of current switches of said second current switch array; the two output terminals of each of said plurality of current changeover switches of the last stages of said plurality of stages of current switch arrays being connected with two of said plurality of current switches of said first current switch array respectively; each of said plurality of current changeover switches of the other stages of said plurality of stages of current switch arrays being connected at its common input terminal with an output terminal of one of said plurality of current changeover switches of the previous stage and at its two output terminals with the common input terminals of two of said plurality of current changeover switches of the next stage thereby to be connected dendritically, and wherein said first control signal is composed of a plurality of pairs of complimentary signals applied to said plurality of stages of current switch arrays, respectively, each pair of said plurality of pairs of complimentary signals being applied respectively to said two control terminals of said plurality of current changeover switches of each of said plurality of stages of current switch arrays.

3. The apparatus according to claim 2, wherein each of said plurality of changeover switches comprises a pair of transistors connected at the emitters in common as said common input terminal, the collectors of said pair of transistors being said two output terminals and the bases of said pair of transistors being said two control terminals.

4. The image sensor according to claim 2, wherein said drive circuit comprises a counter circuit applied with a clock signal as an input signal, a code change circuit for converting a parallel output signal of said counter to a specified coded signal, a first control signal producing circuit for producing said first control signal from said specified coded signal, and a second control signal producing circuit applied as an input signal with the most significant bit signal of said parallel output signal of said counter for producing said second control signal.

5. The image sensor according to claim 4, wherein said first control signal producing circuit comprises a plurality of exclusive OR gates corresponding to parallel output terminals of said counter, each of said plurality of exclusive OR gates being connected at one input terminal with corresponding one bit terminal of said parallel output terminals of said counter at the other input terminal with the upper next bit terminal of said parallel output terminals of said counter, the other input terminal of one of said plurality of exclusive OR gates corresponding to the most significant bit terminal being connected with the carry terminal of said counter, thereby to produce said specified coded signal at output terminals of said plurality of exclusive OR gates; and wherein said second control signal producing circuit comprises a shift register to produce said second control signal at its parallel output terminals, whereby said plurality of phototransistors is activated in a sequential order.

6. The image sensor according to claim 1, wherein each of said plurality of current switches of said first current switch array comprises a PNP transistor connected at the base with one of output terminals of said plurality of decoder circuits, at the collector with a positive voltage source, and at the emitter with the collector of one of said plurality of phototransistors, emitters of said plurality of phototransistors being connected in common to be an output terminal of said phototransistor array.

7. The image sensor according to claim 1, wherein each of said plurality of switches of said first current switch array comprises a complimentary PNP transistor composed of a PNP transistor and an NPN transistor which are complimentary-darlington connected with each other, said PNP transistor being connected at the base with one of output terminals of said plurality of decoder circuits, at the emitter with a positive voltage source, and at the collector with the base of said NPN transistor through a resistor; and said NPN transistor being connected at the collector with said positive voltage source, and at the emitter with a collector of one of said plurality of phototransistors, emitters of said plurality of phototransistors being connected in common to be an output terminal of said phototransistor array.

8. A self scanning type image sensor for converting an optical signal to an electric signal comprising:
a phototransistor array composed of a plurality of phototransistors for converting an optical signal to an electric current signal;
an NPN transistor array composed of a plurality of NPN transistors which are connected with said plurality of phototransistors, respectively;
a PNP transistor array composed of a plurality of PNP transistors which are connected with said plurality of NPN transistors, respectively;
a plurality of decoder circuits each for selecting one of said plurality of PNP transistors according to a first control signal;
a current switch array composed of a plurality of current switches for selecting one of said plurality of decoder circuits according to a second control signal;
a current source circuit for supplying a current to said selected one of said plurality of decoder circuits through selected one of said plurality of current switches of said current switch array;
a drive circuit for producing said first control signal applied to each of said plurality of decoder circuits and said second control signal applied to said current switch array; and
an output circuit for converting said current signal from said phototransistor array to a voltage signal.

9. The image sensor according to claim 8, wherein each of said plurality of decoder circuits comprises a plurality of stages of current switch arrays composed of a plurality of current changeover switches each having a common input terminal, two output terminals and two control terminals corresponding to said two output terminals; the first stage of said plurality of stages of current switch arrays comprising a single current changeover switch connected at its common input terminal with one of said plurality of current switches of said current switch array; the two output terminals of each of said plurality of current changeover switches of the last stages of said plurality of stages of current switch arrays being connected with two of said plurality of PNP transistors of said PNP transistor array, respectively; each of said plurality of current changeover switches of the other stages of said plurality of stages of current switch arrays being connected at its common input terminal with an output terminal of one of said plurality of current changeover switches of the previous stage and at its two output terminals with the common input terminals of two of said plurality of current changeover switches of the next stage thereby to be connected dendritically, and wherein said first control signal is composed of a plurality of pairs of complimentary signals applied to said plurality of stages of current switch arrays, respectively, each pair of said plurality of pairs of complimentary signals being applied respectively to said two control terminals of said plurality of current changeover switches of each of said plurality of stages of current switch arrays.

10. The apparatus according to claim 9, wherein each of said plurality of changeover switches comprises a pair of transistors connected at the emitters in common as said common input terminal, the collectors of said pair of transistors being said two output terminals and the bases of said pair of transistors being said two control terminals.

11. The image sensor according to claim 9, wherein said drive circuit comprises a counter circuit applied with a clock signal as an input signal, a code change circuit for converting a parallel output signal of said counter to a specified coded signal, a first control signal producing circuit for producing said first control signal from said specified coded signal, and a second control signal producing circuit applied as an input signal with the most significant bit signal of said parallel output signal of said counter for producing said second control signal.

12. The image sensor according to claim 11, wherein said first control signal producing circuit comprises a plurality of exclusive OR gates corresponding to parallel output terminals of said counter, each of said plurality of exclusive OR gates being connected at one input terminal with corresponding one bit terminal of said parallel output terminals of said counter at the other input terminal with the upper next bit terminal of said parallel output terminals of said counter, the other input terminal of one of said plurality of exclusive OR gates corresponding to the most significant bit terminal being connected with the carry terminal of said counter, thereby to produce said specified coded signal at output terminals of said plurality of exclusive OR gates; and wherein said second control signal producing circuit comprises a shift register to produce said second control signal at its parallel output terminals, whereby said plurality of phototransistors is activated in a sequential order.

13. The image sensor according to claim 8, wherein said plurality of PNP transistors are connected at the collectors with the bases of said plurality of NPN transistors respectively, at the bases with output terminals of said plurality of decoder circuits respectively and a positive voltage source through resistors respectively, and at the emitters in common; and said plurality of NPN transistors are connected at the emitters with a positive voltage source and at the collectors with the bases of said plurality of phototransistors respectively, the collectors of said plurality of phototransistors being connected in common to be an output terminal of said phototransistor array.

14. The image sensor according to claim 13, further comprising a second phototransistor array composed of a plurality of phototransistors connected at the collectors in common to be an output terminal of said second phototransistor array, wherein said plurality of NPN transistors are double collector NPN transistors having second collectors respectively, said second collectors of said double collector NPN transistors being connected with the emitters of said plurality of phototransistors of said second phototransistor array.

15. The image sensor according to claim 14, further comprises a light reception window provided on said phototransistor array, and a light interception cover provided on said second phototransistor array; and wherein said output circuit comprises a differential amplifier connected at its differential input terminals with said output terminals of said phototransistor array and of said second phototransistor array respectively, thereby to cancel a noise and a dark signal included in said current signal from said phototransistor array.

16. A self scanning type image sensor for converting an optical signal to an electric signal comprising:
a phototransistor array composed of a plurality of phototransistors connected at the collecters in common for converting an optical signal to an electric current signal;
an NPN transistor array composed of a plurality of NPN transistors connected at the collectors with the emitters of said plurality of phototransistors respectively and at the emitters with a positive voltage source;
a PNP transistor array composed of a plurality of PNP transistors connected at the collectors with the bases of said plurality of NPN transistors respectively and at the bases with said positive voltage source through resistors respectively;
a plurality of decoder circuits each for selecting one of said plurality of PNP transistors of said PNP transistor array according to a first control signal;
a current switch array composed of a plurality of current switches for selecting one of said plurality of decoder circuits according to a second control signal;
a current source circuit for supplying a current to said selected one of said plurality of decoder circuits through selected one of said plurality of current switches of said current switch array;
a drive circuit for producing said first control signal applied to each of said plurality of decoder circuits and said second control signal applied to said current switch array; and
an output circuit for converting said current signal from said phototransistor array to a voltage signal,
each of said plurality of decoder circuits comprises a plurality of stages of transistor arrays composed of a plurality of pairs of transistors, each pair connected at the emitters in common; the first stage of said plurality of stages of transistor arrays comprising a single pair of transistors connected at the common emitter with one of said plurality of current switches of said current switch array; the collectors of said plurality of pairs of transistors of the last stages of said plurality of stages of transistor arrays being connected with the bases of said plurality of PNP transistors of said PNP transistor array respectively; each of said plurality of pairs of transistors of the other stages of said plurality of stages of transistor arrays being connected at the common emitters with a collector of one of said plurality of pairs of transistors of the previous stage and at the two collectors with the common emitters of two of said plurality of pairs of transistors of the next stage thereby to be connected dendritically, and said first control signal is composed of a plurality of pairs of complimentary signals applied to said plurality of stages of current switch arrays respectively, each pair of said plurality of pairs of complimentary signals being applied respectively to the bases of said plurality of pairs of transistors of each of said plurality of stages of transistor arrays.

17. The image sensor according to claim 16, wherein said drive circuit comprises a counter circuit applied with a clock signal as an input signal, a code change circuit for converting a parallel output signal of said counter to a specified coded signal, a first control signal producing circuit for producing said first control signal from said specified coded signal, and a second control signal producing circuit applied as an input signal with the most significant bit signal of said parallel output signal of said counter for producing said second control signal.

18. The image sensor according to claim 17, wherein said first control signal producing circuit comprises a plurality of exclusive OR gates corresponding to parallel output terminals of said counter, each of said plurality of exclusive OR gates being connected at one input terminal with corresponding one bit terminal of said parallel output terminals of said counter at the other input terminal with the upper next bit terminal of said parallel output terminals of said counter, the other input terminal of one of said plurality of exclusive OR gates corresponding to the most significant bit terminal being connected with the carry terminal of said counter, thereby to produce said specified coded signal at output terminals of said plurality of exclusive OR gates; and wherein said second control signal producing circuit comprises a shift register to produce said second control signal at its parallel output terminals, whereby said plurality of phototransistors is activated in a sequential order.

19. The image sensor according to claim 16, further comprising a second phototransistor array composed of a plurality of phototransistors connected at the collectors in common, wherein said plurality of NPN transistors are double collector NPN transistors having second collectors connected with the emitters of said plurality of phototransistors of said second phototransistor array.

20. The image sensor according to claim 19, further comprises a light reception window provided on said phototransistor array, and a light interception cover provided on said second phototransistor array; and wherein said output circuit comprises a differential amplifier connected at its differential input terminals with said common collectors of said phototransistor array and of said second phototransistor array respectively, thereby to cancel a noise and a dark signal included in said current signal from said phototransistor array.

* * * * *